(12) United States Patent
Hirota et al.

(10) Patent No.: US 11,796,044 B2
(45) Date of Patent: Oct. 24, 2023

(54) FINAL DRIVE GEAR DEVICE CAPABLE OF TEMPORARILY EFFECTING DIFFERENTIAL MOTION

(71) Applicant: GKN Automotive Limited, Birmingham (GB)

(72) Inventors: Isao Hirota, Tochigi (JP); Noboru Higano, Tochigi (JP); Manabu Endou, Tochigi (JP); Kazuhiro Ohashi, Tochigi (JP); Shungo Numabe, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 64 days.

(21) Appl. No.: 17/500,131

(22) Filed: Oct. 13, 2021

(65) Prior Publication Data

US 2022/0034391 A1    Feb. 3, 2022

Related U.S. Application Data

(63) Continuation of application No. PCT/JP2019/016456, filed on Apr. 17, 2019.

(51) Int. Cl.
*F16H 48/24* (2006.01)
*B60K 17/16* (2006.01)
(Continued)

(52) U.S. Cl.
CPC ........... *F16H 48/24* (2013.01); *B60K 17/165* (2013.01); *F16H 48/34* (2013.01); *F16H 48/08* (2013.01)

(58) Field of Classification Search
CPC ....... B60K 17/165; F16H 48/08; F16H 48/24; F16H 48/34
(Continued)

(56) References Cited

U.S. PATENT DOCUMENTS 4,703,671 A * 11/1987 Jikihara .............. F16H 63/3023
                                                        475/158
5,326,333 A    7/1994 Niizawa et al.
(Continued)

FOREIGN PATENT DOCUMENTS

CN    105723112 A    6/2016
CN    107110328 A    8/2017
(Continued)

OTHER PUBLICATIONS

International Search Report and Written Opinion for PCT/JP2019/016456 dated Jul. 9, 2019 (7 pages; with English translation).
(Continued)

*Primary Examiner* — Leslie A Nicholson, III
(74) *Attorney, Agent, or Firm* — Bejin Bieneman PLC

(57) ABSTRACT

A gear device drivingly coupling a drive shaft with first and second axles is provided with a case coupled via gearing with the drive shaft, and rotatable about an axis; a hub that is couplable with the first axle; a clutch member retained by the case and disengageably engaged with the hub; a biasing element retaining the clutch member at a position where the clutch member engages with the hub; and a differential gear set coupling the case via gearing with the first and second axles and locked by the clutch member to prevent differential motion between the first axle and the second axle.

3 Claims, 6 Drawing Sheets

(51) Int. Cl.
*F16H 48/34* (2012.01)
*F16H 48/08* (2006.01)

(58) Field of Classification Search
USPC .......................................................... 475/150
See application file for complete search history.

(56) References Cited

U.S. PATENT DOCUMENTS

| | | | | |
|---|---|---|---|---|
| 6,109,615 A * | 8/2000 | Gildea | ................... | F16H 48/22 |
| | | | | 277/628 |
| 6,575,868 B1 * | 6/2003 | Keusch | ................... | F16H 48/30 |
| | | | | 475/249 |
| 6,755,763 B1 * | 6/2004 | Goto | ....................... | F16H 48/34 |
| | | | | 475/237 |
| 7,354,374 B2 * | 4/2008 | Teraoka | .................. | F16H 48/34 |
| | | | | 475/231 |
| 7,452,299 B2 * | 11/2008 | Teraoka | .................. | F16H 48/34 |
| | | | | 192/84.92 |
| 7,887,450 B2 * | 2/2011 | Fusegi | ..................... | F16H 48/34 |
| | | | | 192/84.96 |
| 8,348,799 B2 * | 1/2013 | Maruyama | ............... | F16H 48/34 |
| | | | | 192/84.1 |
| 8,591,375 B2 * | 11/2013 | Maruyama | ............ | F16D 27/118 |
| | | | | 192/84.92 |
| 9,605,740 B2 * | 3/2017 | Povirk | .................. | B60K 17/344 |
| 9,651,131 B2 * | 5/2017 | Raghavan | .............. | F16D 27/118 |
| 9,695,922 B2 * | 7/2017 | Yamanaka | ............. | F16D 27/118 |
| 10,308,113 B2 * | 6/2019 | Inose | .................... | B60K 17/165 |
| 10,557,542 B2 * | 2/2020 | Numabe | .................. | F16D 23/12 |
| 10,982,744 B2 * | 4/2021 | Johnson | ................ | B60K 17/346 |
| 11,402,006 B2 * | 8/2022 | Hirota | ...................... | F16H 48/40 |
| 2003/0224896 A1 * | 12/2003 | Chung | ................... | F16H 48/08 |
| | | | | 475/231 |
| 2007/0197338 A1 | 8/2007 | Fusegi | | |
| 2016/0223064 A1 | 8/2016 | Yamanaka et al. | | |
| 2017/0297428 A1 | 10/2017 | Nose et al. | | |
| 2018/0195596 A1 | 7/2018 | Molde et al. | | |
| 2018/0306297 A1 | 10/2018 | Komatsu | | |

FOREIGN PATENT DOCUMENTS

| | | |
|---|---|---|
| EP | 3263951 A1 | 1/2018 |
| JP | 2004104974 A | 4/2004 |
| JP | 2011033117 A | 2/2011 |
| WO | 2015056330 A1 | 4/2015 |
| WO | 2016135826 A1 | 9/2016 |
| WO | 2018200276 A1 | 11/2018 |

OTHER PUBLICATIONS

Office Action from Chinese Patent Office for related application No. CN201980095401.0 dated Mar. 30, 2023 (14 pages; with English machine translation).

* cited by examiner

FINAL DRIVE GEAR DEVICE CAPABLE OF TEMPORARILY EFFECTING DIFFERENTIAL MOTION

CROSS-REFERENCE TO RELATED APPLICATIONS

This application is a continuation Application of PCT International Application No. PCT/JP2019/016456 (filed Apr. 17, 2019), the entire contents of which are incorporated herein by reference.

BACKGROUND

A vehicle turning at a corner must allow difference in speed of rotation between drive wheels because the right and left drive wheels respectively trace arcs of different length. A vehicle mainly adapted for running on a paved road usually uses a final drive containing a differential in order to transmit torque to drive wheels with allowing such difference in speed of rotation. It often contains a device for limiting differential motion by the differential (so-called "limited slip differential") or locking differential motion (so-called "locking (or lock-up) differential") in order to transmit torque to one of the drive wheels even when the other wheel temporarily loses traction. US Published Patent Application No. 2018/0195596A1 The PTL 1 discloses a related apparatus.

A vehicle referred to as an "All Terrain Vehicle" (abbreviated as "ATV") is used mainly for the purpose of travel on rough roads such as dirt tracks. One or both wheels may frequently lose traction while such a vehicle is running. To allow differential motion may rather impede torque transmission, and frequent repetition of free spin and limiting of differential motion may impose considerable loads on the engine and the drivetrain. A differential is thus not applied to an ATV and its right and left axles are directly connected in many cases. The drive wheels may readily slip on rough roads but such slips rather absorb difference in rotational speed.

SUMMARY

This disclosure includes a gear device in a vehicle used for driving a pair of drive wheels in an identical speed of rotation, which only in a particular event enables differential motion between the drive wheels.

Even an ATV has some occasions to run on a paved road or on grass in very limited opportunities, for example in opportunities where it is loaded on or unloaded from a trailer, or it is put in or pulled out of a garage. Without differential motion, tires on a paved road would be damaged and, if on grass, would spoil the grass. On the other hand, it is irrational to steadily suffer from the aforementioned disadvantages in exchange for the measure against these limited opportunities, and constant input of any external energy such as electric power is required to lock the differential motion and thus impair energy efficiency. The device disclosed hereafter has been created in light of these problems.

According to an aspect, a gear device drivingly coupling a drive shaft with first and second axles is provided with a case coupled via gearing with the drive shaft to rotate about an axis; a hub capable of coupling with the first axle; a clutch member retained by the case and disengageably engaged with the hub; a biasing element retaining the clutch member at a position where the clutch member engages with the hub; and a differential gear set coupling the case via gearing with the first and second axles and being locked by the clutch member not to allow differential motion between the first axle and the second axle.

DESCRIPTION OF EMBODIMENTS

Exemplary embodiments will be described hereinafter with reference to the appended drawings. Throughout the following description and the appended claims, an axis means a rotational axis of axles, which is usually consistent with a rotational axis of a gear device. Further, an axial direction means a direction parallel thereto, a radial direction perpendicular thereto, and a circumferential direction a direction going around the axis.

Figure 1:
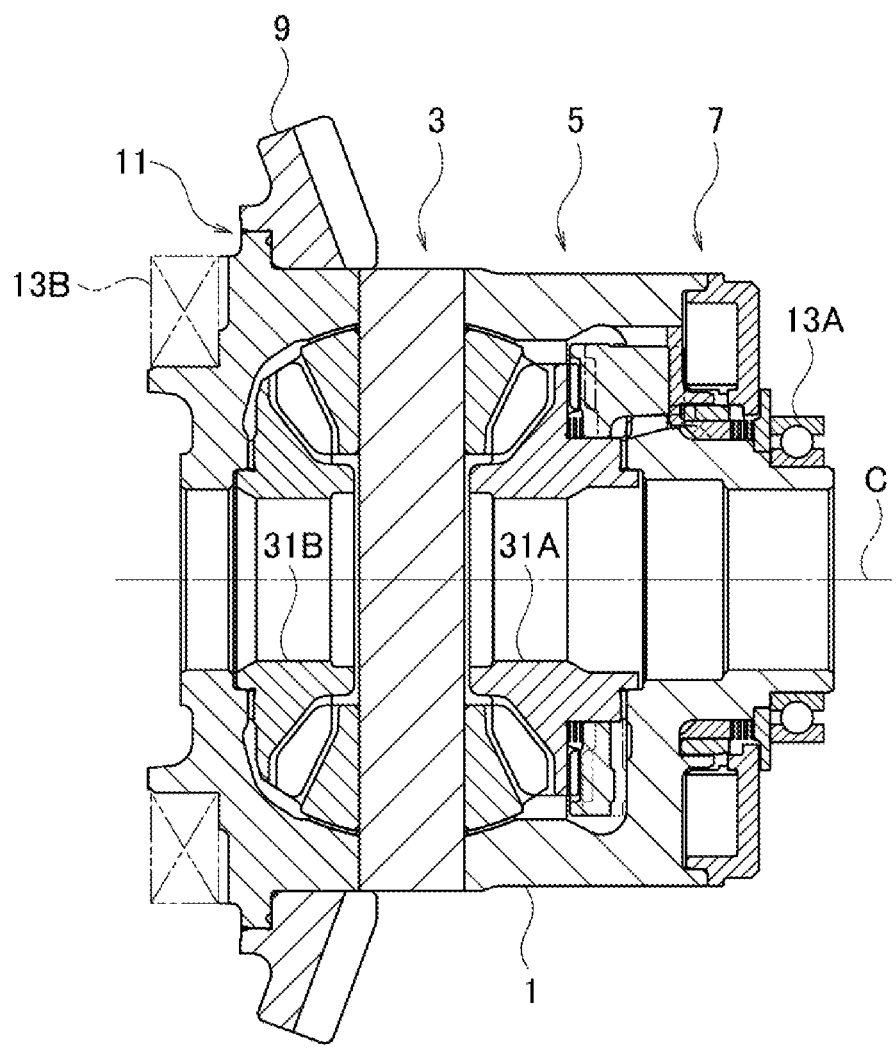
FIG. 1 is a sectional elevational view of a gear device according to an embodiment.

Referring mainly to FIG. 1, a gear device according to the present embodiment is usable as a final drive that transmits torque from a drive shaft to a pair of axles and only temporarily allow differential motion therebetween, and is preferably applicable to an ATV in particular. The gear device is generally provided with a case 1 rotating about an axis C, a differential gear set 3 differential motion of which is locked in a steady state, a clutch 5 for locking the differential motion, an actuator 7 for driving the clutch 5 to release the lock, and a ring gear 9 for coupling via gearing with the drive shaft.

Figure 2:
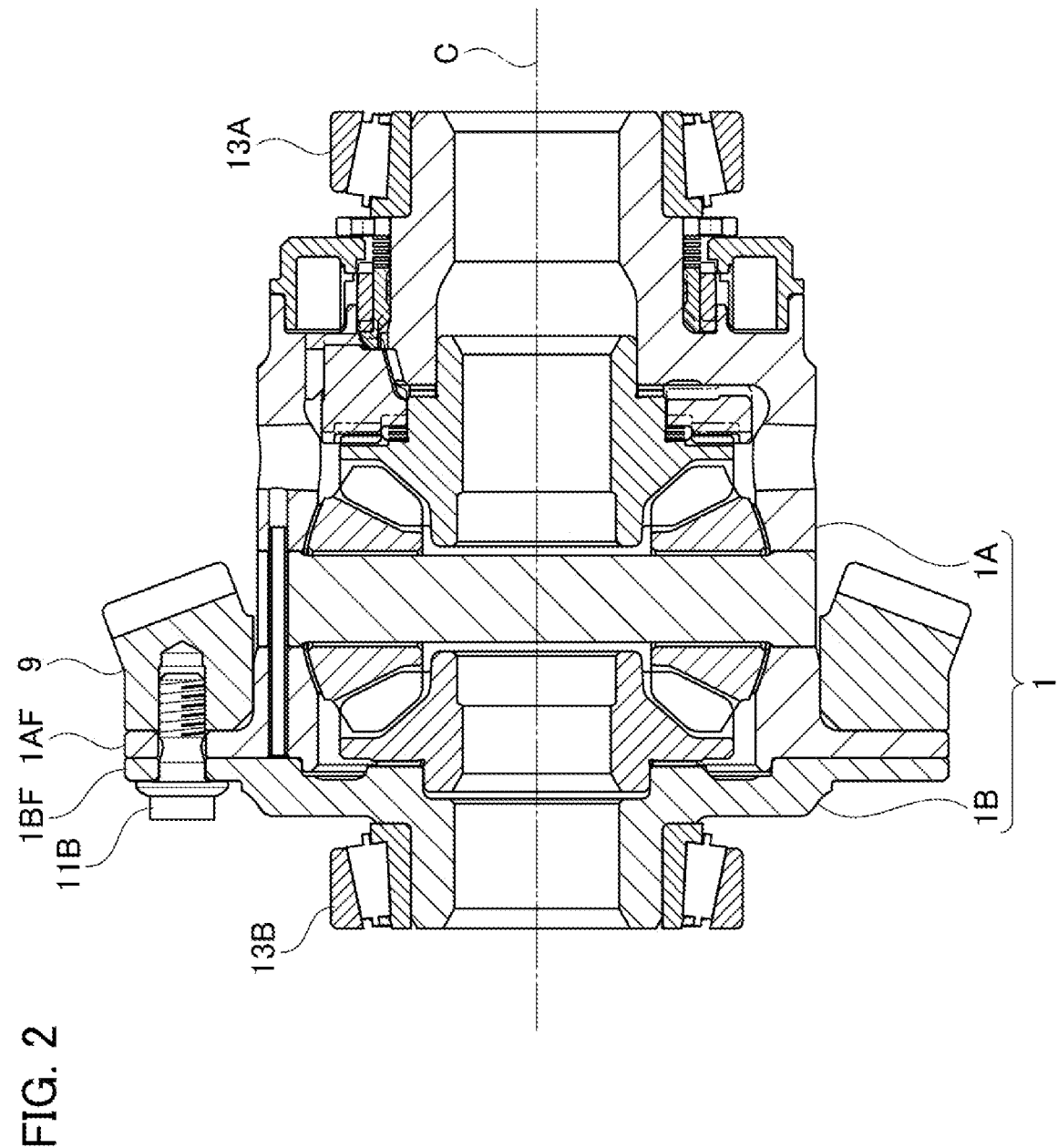
FIG. 2 is a sectional elevational view of a gear device according to another embodiment.

The case 1 is generally cylindrical around the axis C and the whole thereof may be of a single unitary body (the one-piece type). In a case of this type, the case 1, a peripheral surface thereof for example, has an opening having corresponding dimensions for the purpose of installation of components into its interior. Alternatively, as shown in FIG. 2, the case 1 may be divided into a main body 1A and a lid body 1B (the two-piece type). Based on this type, as the interior of the main body 1A is, before fixation of the lid body 1B thereto, exposed to the exterior, the opening for installation of the internal components is unnecessary. Of course, the case 1 may be divided into three parts or more.

On the case 1, for example, on an outer periphery thereof, the ring gear 9 is fixed and is coupled via gearing with the drive shaft. The case 1 may be unitarily provided with a portion such as a flange for abutting on the ring gear 9 to place it in position. As shown in FIG. 1, welding metal fused into a weld portion 11 as a gap between this portion and the ring gear 9 may combine the ring gear 9 with the case 1. The weld portion 11 may have a weld groove for the convenience of welding. Further, to facilitate welding, the weld portion 11 may be as shown in FIG. 1 exposed to the axial direction at one end of the case 1, or directed radially outward.

Or, as shown in FIG. 2, fixation between the case 1 and the ring gear 9 may be effected by fastening by bolts 11B. In this case, the main body 1A and the lid body 1B may be respectively provided with corresponding flanges 1AF, 1BF and bolts 11B may be fastened therein to effect co-fixation among the ring gear 9 and the flanges. Or, any other fixation means independent of the bolts 11B may be used for fixation between the main body 1A and the lid body 1B.

Figure 5:
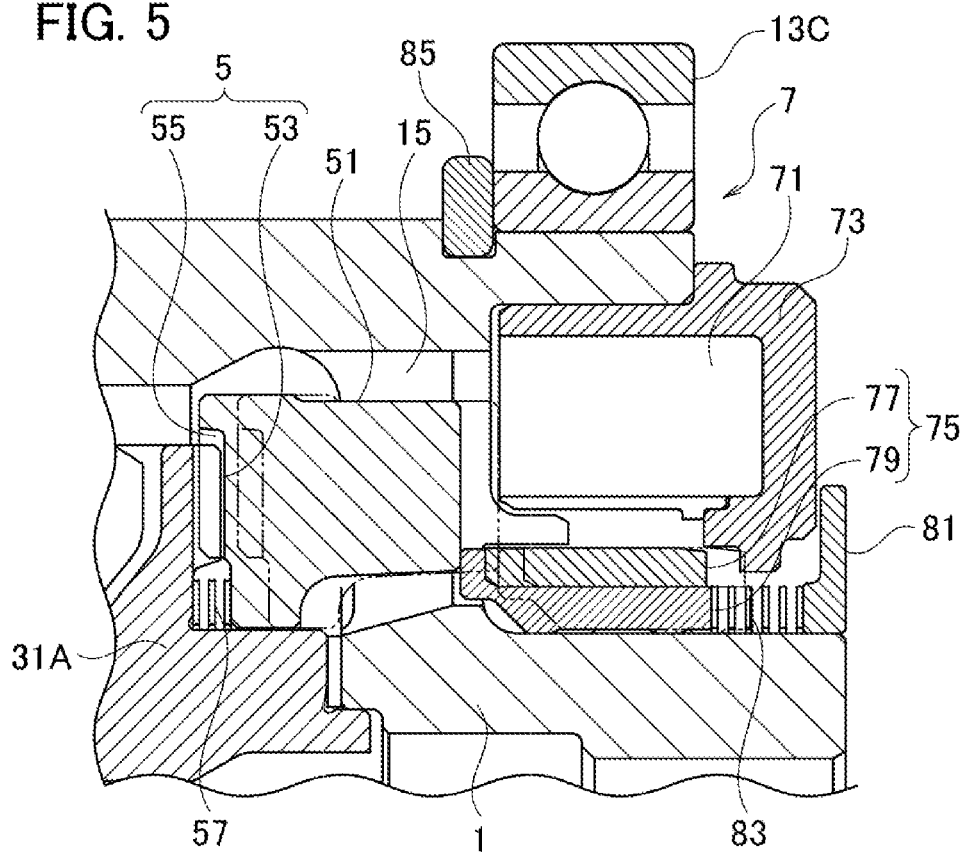
FIG. 5 is a partial sectional elevational view according to another modified example.

By receiving the torque via the ring gear 9 from the drive shaft, the case 1 rotates about the axis C. To enable smooth rotation, the case 1 is for example rotatably supported around both ends thereof by ball or roller bearings 13A, 13B respectively. The bearings may fit on boss portions axially projecting from the case 1 but, instead thereof or in addition thereto, a bearing 13C fitting on the outer periphery of the case 1 as shown in FIG. 5 is usable. To place the bearing 13C in position usable is a pin or ring 85 fitting on, engaged on, press-fit on, or joined with the outer periphery of the case 1.

The differential gear set 3 is supported by the case 1 and is coupled via gearing with side gears 31A, 31B respectively coupled with axles, thereby mediating torque transmission from the case 1 to the side gears 31A, 31B. As the clutch 5 is locked in the steady state, the differential gear set 3 makes both the axles rotate in the same speed but, when the lock is released, allows differential motion between the side gears 31A, 31B. Although FIGS. 1 and 2 illustrate the differential gear set 3 of the bevel gear type, any other type is possible of course.

Figure 3:
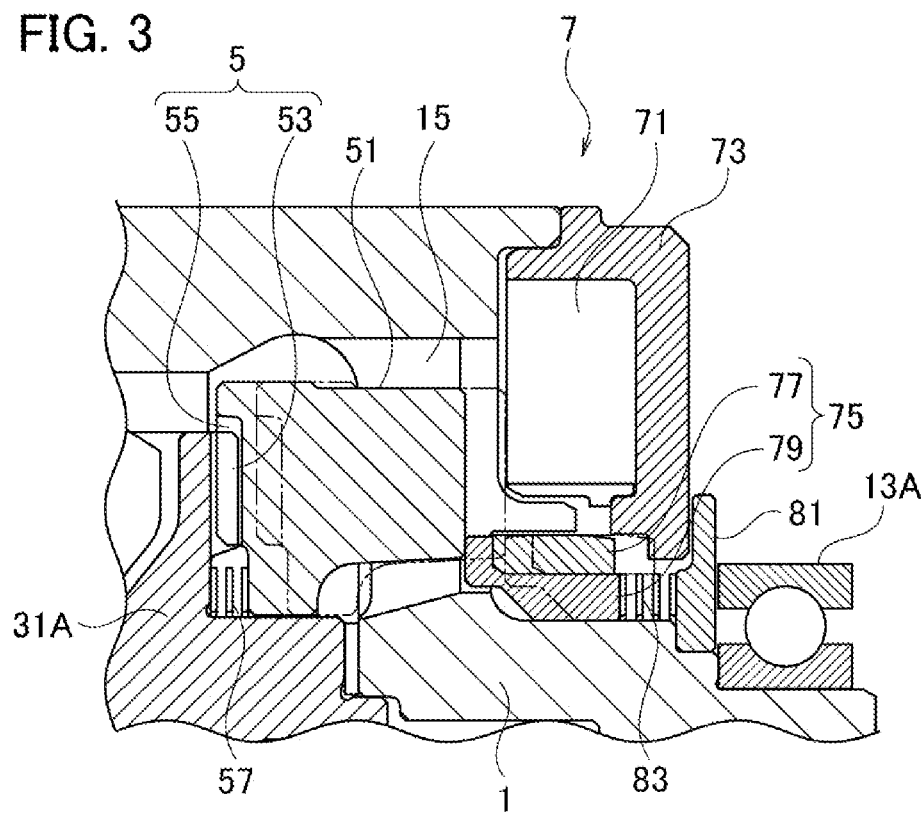
FIG. 3 is a partial sectional elevational view which shows an enlarged view around a clutch and an actuator in the gear device of FIG. 1.

Referring mainly to FIG. 3 in combination with FIG. 1, the clutch 5 is formed of dog teeth 53 and dog teeth 55 toothed on the clutch member 51 so as to engage therewith. Further, in place of the dog teeth mutually in mesh, any engaging structure such as keys, splines or lugs could be used and further any limiting means may be used.

The dog teeth 53 or the other engaging structure is toothed on a hub coupled with one axle and the hub is for example the side gear 31A. Such a configuration is beneficial in simplifying the structure of the device, whereas the hub may be any member independent of the side gear 31A. Such a hub member is engaged or coupled with the side gear 31A or the axle but may be unitized therewith instead.

The clutch member 51 is movable in the axial direction from an engaged position drawn by solid lines in the drawings to a disengaged position drawn by double-dotted chain lines. In the steady state the clutch member 51 is retained at the engaged position by biasing means as described later to lock the differential gear set 3, thereby locking the differential motion between both the axles.

The clutch member 51 is disk-like around the axis C and is provided with the dog teeth 55 on one face thereof and one or more legs projecting from the other face thereof, which are at even intervals in the circumferential direction. The case 1, on the other hand, has through-holes 15 corresponding to these legs. The legs of the clutch member 51 respectively pass through the through-holes 15 and there front on the actuator 7.

The actuator 7 can be an electromagnetic actuator that is put into operation when electric power is applied, for example. One example thereof is a combination of a solenoid 71 energized by electric power and a plunger 75 driven thereby as described below. As the plunger 75 moves forward and backward in the axial direction, the clutch member 51 accordingly moves forward and backward. Alternatively, the actuator 7 can be an actuator in which a solenoid 71 by itself moves forward and backward to set the clutch member 51 forward and backward.

Figure 4:
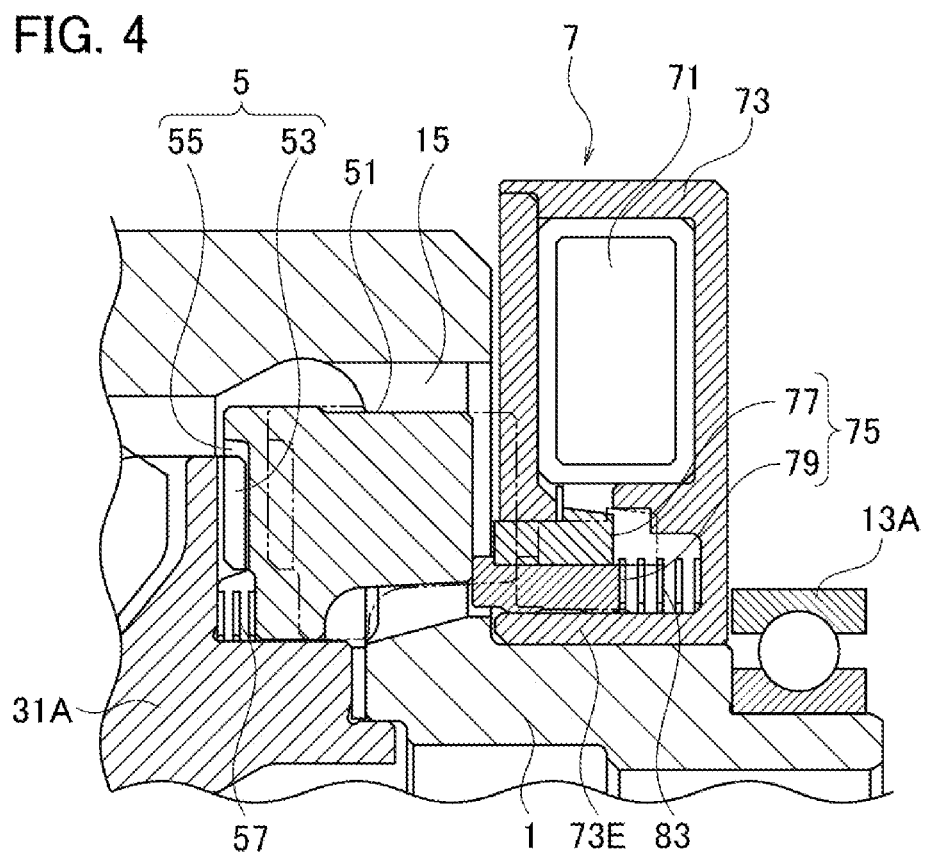
FIG. 4 is a partial sectional elevational view according to a modified example.

The solenoid 71 can be provided with a core 73 for conducting magnetic flux. As the core 73 is next to the end of the case 1 and is, along with the solenoid 71, prevented from rotating relative to the carrier, it rotates relative to the case 1. As shown in FIGS. 3, 5, the core 73 may be in touch with the end face of the case 1 and can slide thereon, and further in this case the end face of the case 1 may be used as a part of the core 73. Or, as shown in FIG. 4, the core 73 may be provided with an elongated portion 73E elongated toward the boss portion of the case 1 and may be thus placed in position by the elongated portion 73E, so that the core 73 can be set apart from the end face of the case 1. Whereas the structure shown in FIGS. 3, 5 may cause unignorable friction between the core 73 and the case 1, which is originated from the reaction force by the plunger 75 and the magnetic flux leaking in the case 1, the structure shown in FIG. 4 reduces friction and cuts off energy loss by the magnetic flux leakage.

The plunger 75 is so disposed as to abut the legs of the clutch member 51. The core 73 for example may be provided with a gap so structured as to make the magnetic flux leap over the gap, and the plunger 75 is so disposed as to lie alongside this gap. The plunger 75 may further fit on the boss portion of the case 1, for example, in a slidable manner. As ordinarily the plunger 75 rotates along with the case 1, it makes a rotary motion (rotates) relative to the core 73.

The plunger 75 may be formed of an outer ring 77 and an inner ring 79 unitized mutually by press-fitting or such. The outer ring 77 facing the core 73 may be of a magnetic material such as carbon steel in order to conduct the magnetic flux and the inner ring 79 may be of a non-magnetic material in order to prevent leakage of the magnetic flux.

When electric power is not applied thereto, more specifically not energized, the plunger 75 abuts on the clutch member 51 to place it at the engaged position. To assist in retaining the clutch member 51 at the engaged position, any biasing means may be used and one example thereof is a spring 83.

As shown in FIG. 3, the ring 81 may be engaged with the boss portion of the case 1 for example and the spring 83 may be repulsively interposed between the ring 81 and the plunger 75. Or, as shown in FIG. 5, the ring 81 may be fit on, press-fit on, or joined with the boss portion. Alternatively, as shown in FIG. 4, the spring 83 may be interposed between the core 73, or its elongated portion 73E, and the plunger 75. Still alternatively, the spring 83 may be interposed between the internal surface of the case 1, for example, and the clutch member 51.

Figure 6:
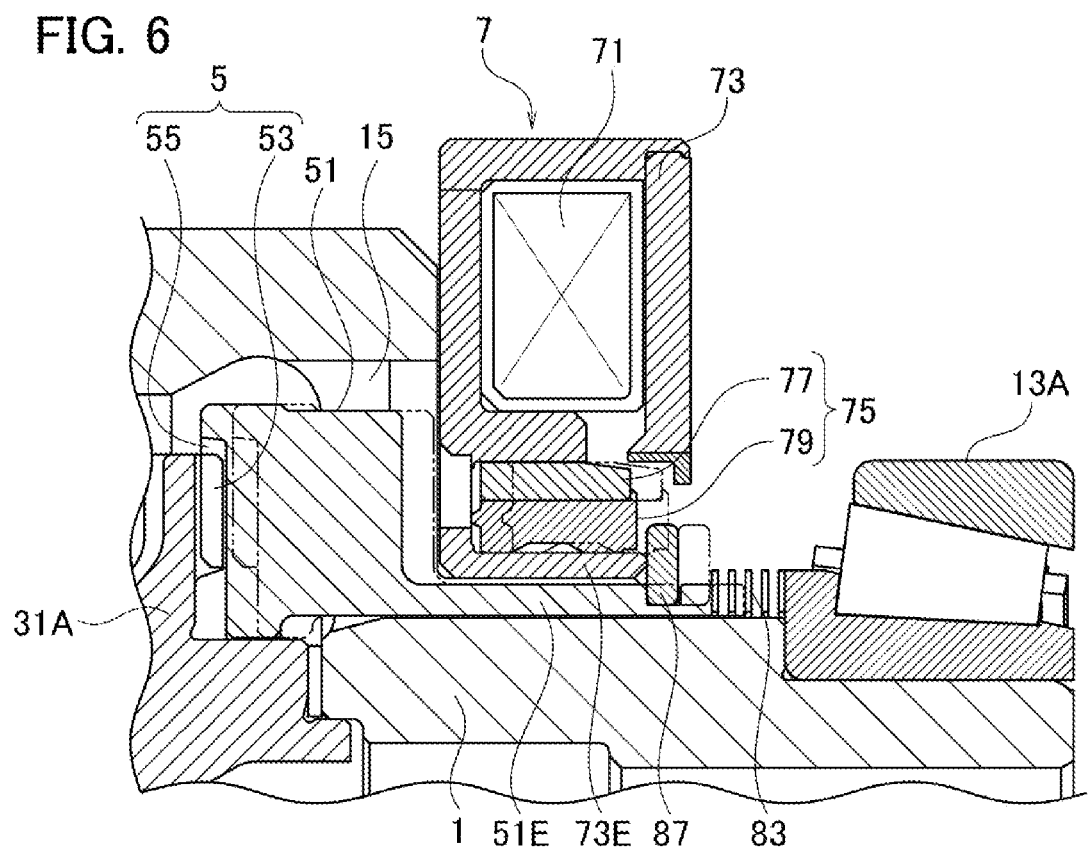
FIG. 6 is a partial sectional elevational view according to still another modified example.

Repulsive force by the spring 83 may be borne only by the ring 81 but, as shown in FIGS. 3 and 4, to impose it on the bearing 13A as well, the bearing 13A may be put in contact with the ring 81 or the elongated portion 73E. Alternatively, as shown in FIG. 6, the bearing 13A alone may bear the force. Further, the spring 83 may be in direct contact with and thus press the clutch member 51.

The spring 83, via the plunger 75, or directly, presses the clutch member 51 steadily and is thus beneficial in retaining it at the engaged position. Further, in a case of the structure in which the solenoid 71 by itself moves forward and backward as described above, the spring 83 may be so disposed as to bias the solenoid 71.

Figure 8:
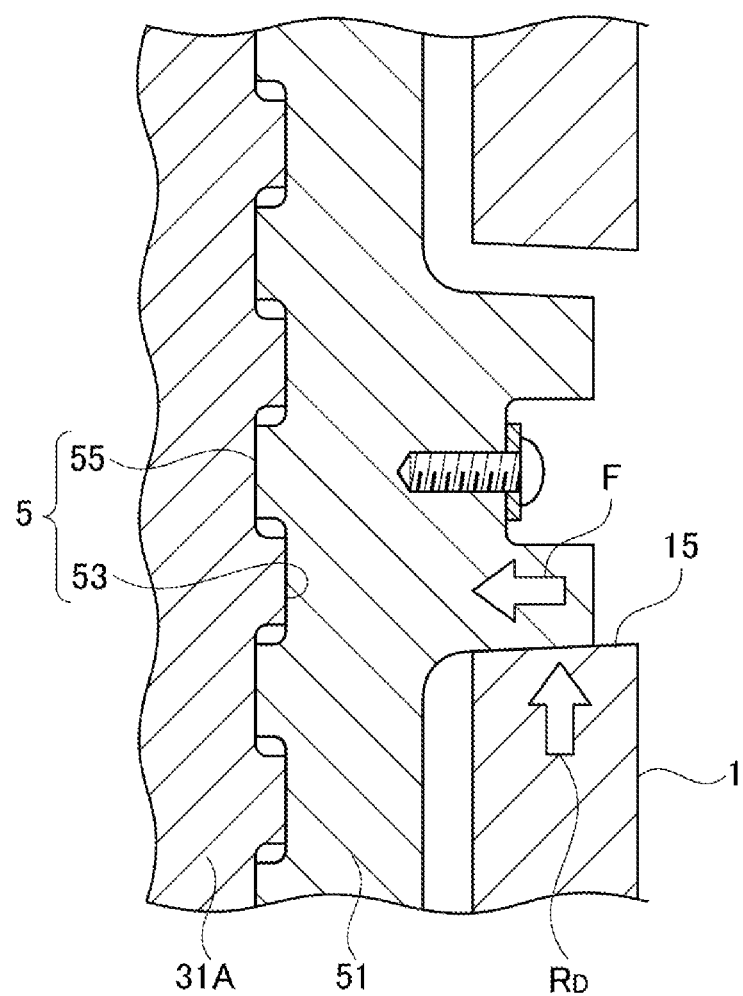
FIG. 8 is a sectional view along a circumferential direction in regard to a gear device, which mainly shows a relation between a clutch member and a through-hole of a case.

In addition to, or in place of, the spring 83, any other biasing means may be used. While FIG. 8 shows an example by a cam mechanism, side faces of the legs of the clutch member 51 and side faces of through-holes 15 of the case 1 are correspondingly slanted to form a cam mechanism of a sort. If the case 1 makes a rotary motion $R_D$, the slanted side faces are mutually in contact and thereby convert the torque partly into thrust force F in the axial direction. The clutch member 51 receives the thrust force F and is thereby retained at the engaged position. The cam may be of course formed not only by the combination of the legs and the through-holes 15 but also by any proper structure.

When the electric power is applied thereto, the magnetic flux generated by the solenoid 71 flows through the core 73 and, as drawn by the magnetic flux leaping over the gap, the plunger 75 moves backward in the axial direction and thus the clutch member 51 moves to the disengaged position. To assist the clutch 5 to disengage, a spring 57 may be used. As illustrated in FIGS. 3 through 5, the spring 57 may be interposed to provide a repulsive force between the side gear 31A and the clutch member 51 for example, or between any other portions. Further, the spring 57 may be so disposed as to draw the clutch member 51 toward the case 1.

Or, in place of, or in addition to, the spring 57, a configuration in which the actuator 7 positively draws the clutch member 51 out is possible. While FIG. 6 illustrates one example thereof, the clutch member 51 may be provided with elongated portions 51E elongated from the legs as unitary or separate bodies, and the plunger 75 may latch on ends thereof or therearound. For such latching, pins or a ring 87 fit on, engaged with, or joined with the elongated portions 51E may be used. When the electric power is applied thereto, as drawn by the magnetic flux leaping over the gap, the plunger 75 moves in the axial direction and, when latching on the elongated portions 51E, draws the clutch member 51, whereby the clutch 5 is disengaged. According to this structure, the spring 57 may be omitted. The elongated portions 51E may be as well used for receiving the biasing force by the spring 83.

While the embodiments described heretofore relate to examples that use actuators electromagnetically driving the clutch member, any other driving device is possible instead of the electromagnetic actuators and such an example is a device using fluid pressure such as hydraulic pressure to drive a piston so as to drive the clutch member. Or, instead of the liquid pressure pneumatic pressure is possible, and further gearing driven by a motor or a cam mechanism may be applied to the actuator 7. In any case, unless electric power is applied to the actuator 7, the clutch 5 stays engaged and the differential motion by the differential gear set 3 is restricted, so that the torque is transmitted to both the drive wheels steadily even on rough roads. The electric power is not exhausted to restrict the differential motion and thus the energy efficiency is not reduced. In particular cases where differential motion is required on paved roads or on the grasses for example, as electric power is on that occasion applied to the actuator 7, the drive wheels are allowed to make differential motion and thus damage to the tires or the road surfaces below is avoided.

Whether the clutch member 51 is at the disengaged position or the engaged position can be determined by application of the electric power to actuator 7, but in addition thereto the gear device may be provided with a device for detecting positions of the clutch member 51. As exemplarily shown in FIG. 7, the gear device may be provided with a flange 19 fixed to the clutch member 51 by means of screws or such and led out of the case 1. Axial positions of the flange 19 can be detected by a mechanical switch, an optical sensor, or a proximity sensor using change of an electrostatic capacitance, an electric field, a magnetic field, or such. These detection devices may be attached to the gear device or any part of the vehicle body.

Figure 7:
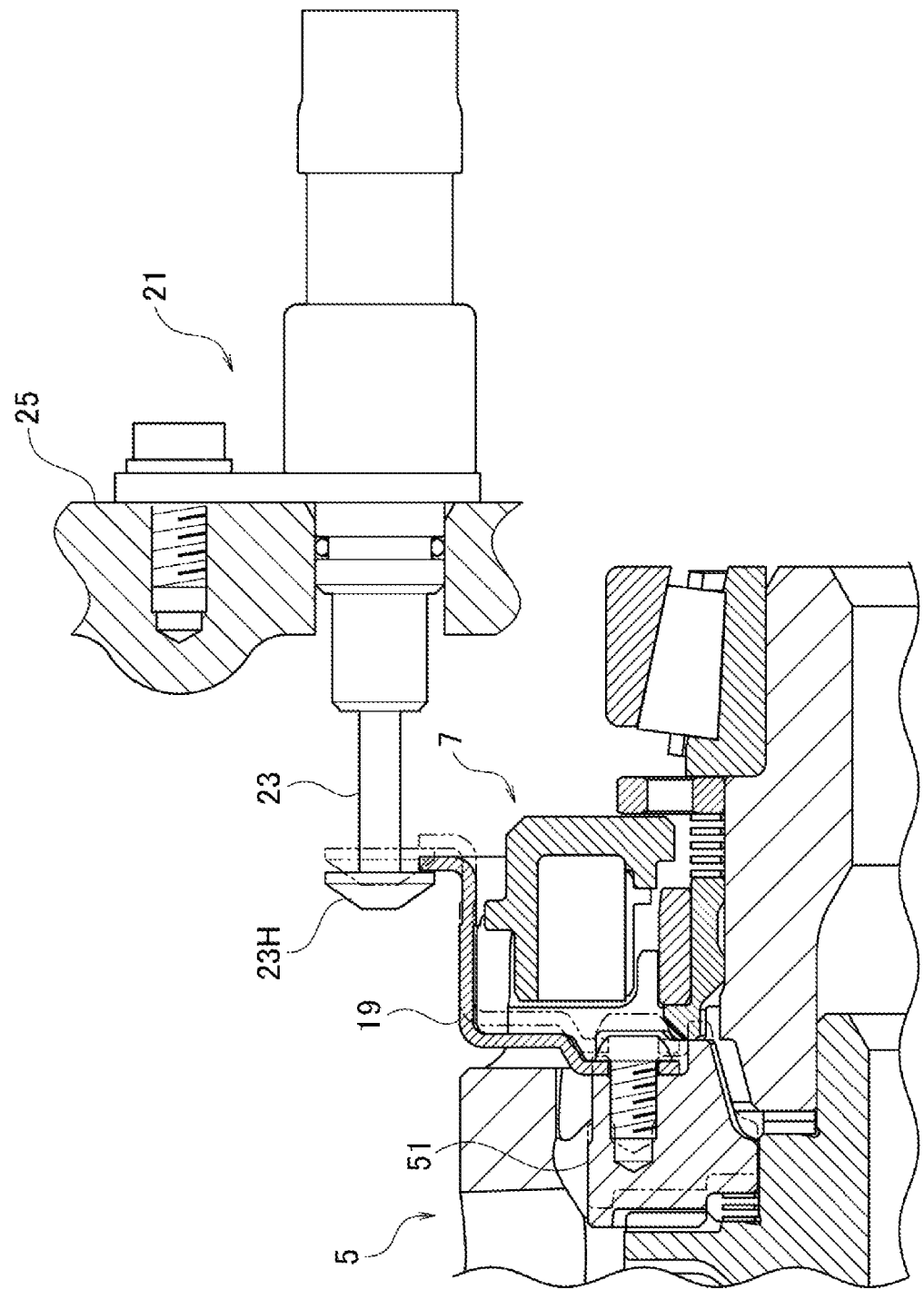
FIG. 7 is a partial sectional elevational view of a gear device according to an example with which a switch is combined.

FIG. 7 illustrates an example in which a pull switch 21 fixed to a wall 25 of the carrier is used. Its rod 23 has a head portion 23H spreading like an umbrella at its distal end and a rim of the flange 19 slidably engages with the head portion 23H. At the engaged position, the rod 23 is drawn out to switch it on and, at the disengaged position, the rod 23 sets back to switch it off. Of course the relation between the position of the rod and ON-OFF may be contrary thereto and further a push switch may be used instead of the pull switch. Moreover, the spring biasing rod may be made to assist, or substituted for, either the spring 57 or the spring 83.

Although certain exemplary embodiments are described above, modifications and variations of the embodiments will occur to those skilled in the art, in light of the above teachings.

What is claimed is:

1. A gear device drivingly coupling a drive shaft with first and second axles, comprising:
   a case coupled via a gearing with the drive shaft, and rotatable about an axis;
   a hub that is couplable with the first axle;
   a clutch member retained by the case and disengageably engaged with the hub;
   a plunger abutting the clutch member;
   a biasing element retaining the clutch member at a position where the clutch member engages with the hub, the biasing element including a first spring interposed between a ring engaged with, fit on, press-fit on, or joined with the casing or a bearing supporting the casing, and with the plunger or the clutch member, to bias the clutch member toward the hub;
   a differential gear set coupling the case via gearing with the first and second axles, and wherein the first axle and the second axle are prevented from rotating at different speeds by locking the differential gear set using the clutch member to prevent differential motion between the first axle and the second axle; and
   a second spring biasing the clutch member away from the hub.

2. The differential device of claim 1, further comprising:
   an actuator put into operation only when electric power is applied to the actuator to drive the clutch member in a direction in which the clutch member is disengaged from the hub.

3. The differential device of claim 1, further comprising:
   a flange fixed to the clutch member and led out of the case; and
   a detection device detecting an axial position of the flange.

* * * * *